May 5, 1970  J. L. PUTZ  3,510,720
TRAVELING WAVE TUBES HAVING FREQUENCY DEPENDENT
ATTENUATIVE GAIN EQUALIZERS
Filed July 3, 1967

INVENTOR.
JOHN L. PUTZ
BY John C Randa

United States Patent Office 3,510,720
Patented May 5, 1970

3,510,720
TRAVELING WAVE TUBES HAVING FREQUENCY DEPENDENT ATTENUATIVE GAIN EQUALIZERS
John L. Putz, Palo Alto, Calif., assignor to Varian Associates, Palo Alto, Calif., a corporation of California
Filed July 3, 1967, Ser. No. 650,892
Int. Cl. H01j 25/34; H01g 1/20
U.S. Cl. 315—3.5      7 Claims

ABSTRACT OF THE DISCLOSURE

Taveling wave tubes having improved gain vs. frequency characteristics are realized by direct incorporation as a part of the tube input or output waveguide circuitry of lossy resonant probe means having variable loss vs. frequency characteristics which can be adjusted to provide a tailored gain vs. frequency characteristic for the traveling wave tube as desired with a minimum of reactive perturbation due to the introduction of the probes into the tube waveguide coupling port or ports. The probes in a preferred embodiment include a pair of dielectric tubes each having a lossy resonant helical-like conductive stripe integrated therewith. The probes protrude into the waveguide with the central axis of the probes oriented such as to lie parallel to the E-fields of the dominant wave in the waveguide.

Brief description

This invention relates in general to an improved traveling wave tube which is characterized by the incorporation of equalizer means in the tube R.F. input or output or both waveguide coupling ports for providing a tailored gain vs. frequency response for the tube in a highly simple and economical manner. The equalizer means includes probe means such as a dielectric tube having its central axis oriented parallel to the E-fields of the dominant wave of the waveguide with a helical-like R.F. lossy-conductive stripe incorporated in the probe to provide a resonant R.F. attenuation vs. frequency response which introduces a minimum of reactive perturbation into the waveguide. By using a pair of probes which are axially displaced along the power flow propagation axis of the waveguide a reduction in V.S.W.R. due to the reactance introduced into the waveguide by the probes, either a single probe or a pair of probes lying in the same E-field plane can be reduced. The utilization of a pair of probes, each having a helical type of conductive stripe also provides an extremely simple mechanism for controlling or tailoring the loss vs. frequency response of the probe equalizer means. The total length of a helical stripe determines the resonant frequency of a probe.

The utilization of a helican type conductive stripe permits compactness of required probe length for a given stripe length and thus permits one to dispose the resonant stripe non-helical primary coupling portion within the E-fields of the guide with a minimal degree of probe penetration into the guide fields. Thus, the total reactance introduced into the guide can be substantially reduced while permitting easy adjustment of overall coupling between an individual probe and the waveguide fields by variation of the amount of probe penetration into the waveguide without affecting the resonant frequency of the probe means. This permits easy adjustment of overall loss or attenuation introduced at the $f_0$ of the probe equalizer as well as permitting individual control of the respective loss vs. frequency probe characteristics via the selection of the conductivity of the conductive helical stripe. By making the helical stripe lengths different on each probe a broadband response can be obtained as desired. Although the above discussion is particularly directed to a pair of axially displaced probes it is clear that three and more probes may be used with obvious advantages with respect to the increased ability to control the overall equalizer response characteristic. A variation of the present invention is the utilization of multifilar helical type conductors in a single probe means. An advantage of the multifilar approach is the ability to obtain a wide band staggered tuned variable loss vs. frequency equalizer response characteristic with a single probe as well as increased loss with reduced probe penetration into the waveguide and thus educed reactive perturbation and a lower V.S.W.R.

It is therefore an object of the present invention to provide a traveling wave tube with integrated probe equalizer means in a waveguide coupling port or ports.

A feature of the present invention is the provision of an absorption type waveguide equalizer means including a probe or probes protruding into the waveguide and oriented in the guide such as to lie parallel to the E-fields of the dominant wave in the waveguide with said probe or probes provided with conductive helical type stripes to provide a variable attenuation vs. frequency response.

These and other features and advantages of the present invention will become more apparent upon a perusal of the following specification taken in conjunction with the accompanying drawings wherein.

Detailed description

Figure 1:
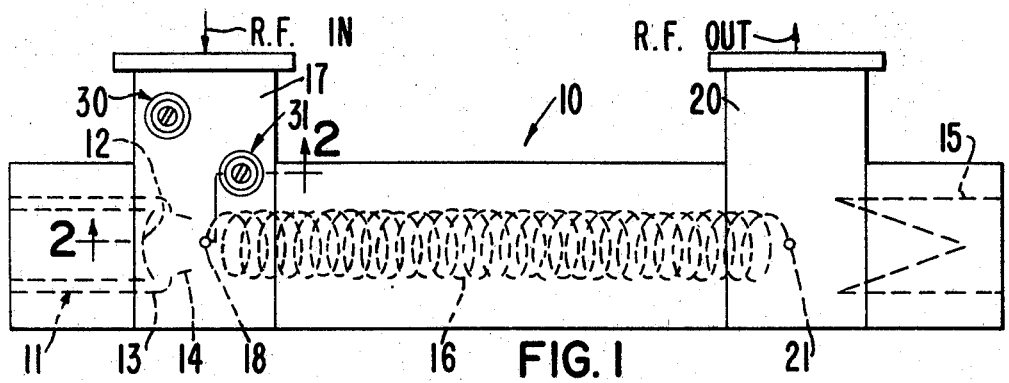
FIG. 1 depicts a plan view, partially schematic, of a traveling wave tube and waveguide equalizer of the present invention.
Figure 2:
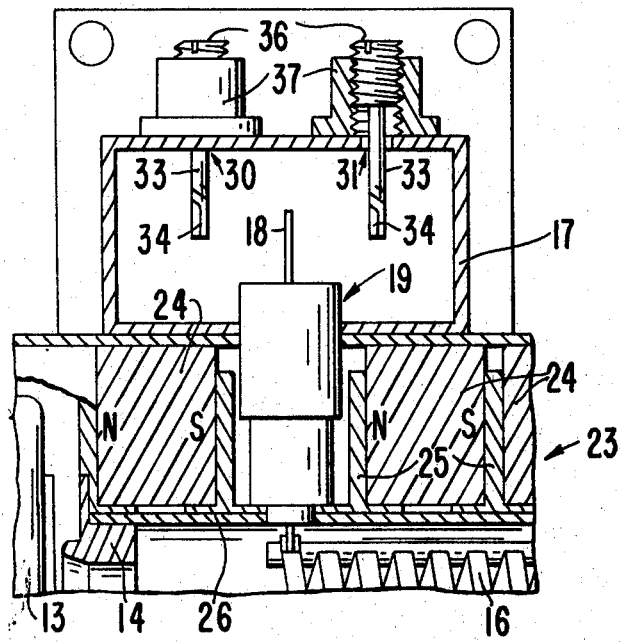
FIG. 2 is an enlarged sectional view of the tube depicted in FIG. 1 taken along the lines 2—2 in the direction of the arrows.

Turning now to FIG. 1, there is depicted a traveling wave tube amplifier 10 incorporating conventional electron gun means 11 including cathode 12, focusing anode 13 and accelerating anode 14 for generating and directing an, e.g., pencil shaped electron beam from the upstream end portion of the tube to the downstream end portion of the tube where the spent beam is collected in a beam collector means 15. The beam traverses the centrol beam axis of the device through a slow wave circuit means such as the helix 16 and provides cumulative beam-wave interaction along the circuit axis to obtain amplification of radio frequency (R.F.) energy which propagates on the slow wave circuit along the device axis in a manner well known in the art. The R.F. energy, e.g., microwave spectrum is introduced via a rectangular waveguide 17 at the upstream end portion of the device and coupled via the center conductor 18 of coaxial probe coupler means 19 directly onto the helix as best seen in FIG. 2. Amplified R.F. energy is removed via rectangular output guide 20 which is coupled to helix 16 via another coaxial probe center conductor 21 in the same manner.

As best seen in FIG. 2, the traveling wave tube 10 may utilize a PPM beam focusing arrangement 23 which includes a plurality of permanent magnets 24 and, e.g., iron pole pieces 25 forming an array about the tube vacuum envelope 26 to control the beam along the tube axis in a manner well known in the art or any other conventional electrostatic or magnetic focusing scheme may equally advantageously be employed without departing from the scope of the present invention. Similarly, although a helix slow wave circuit is depicted in the preferred embodiment of FIGS. 1 and 2, it is to be understood that the present invention is not so restricted as ring-bar, contra-wound helix and other slow wave circuits could obviously be utilized in conjunction with the waveguide equalizer coupler means. For convenience in coupling the traveling wave tube 10 to R.F. source and load means the waveguides 17, 20 are provided with standard coupling flanges 27, 28.

As discussed previously, the gain vs. frequency characteristic of a traveling wave tube will not in general be constant over the operating bandwidth of the tube. This is true for both non-dispersive circuits such as the pure helix and more so for dispersive circuits like, for example, the ring-and-bar circuit. In many applications, it is highly advantageous to obtain a flat gain vs. frequency response over the operating bandwidth of the tube such as, for example, to minimize R.F. signal amplitude distortion across the operating bandwidth. The present invention accomplishes this by incorporating probe type absorption equalizer means within the coupling waveguide of the tube to permit easy control of the tube gain vs. frequency characteristic over the operating band of the tube by the introduction of variable loss vs. frequency probe type equalizer means.

As discussed previously in the above brief description, a preferred embodiment includes a pair of axially off-set probes 30, 31 protruding into waveguide 17 as shown best in FIG. 2. The central axis of the probes is oriented such as to lie parallel to the E-field of the dominant wave in the waveguide 17 which for rectangular guide would typically be the $TE_{10}$ and for circular guide would be the $TE_{11}$. The rectangular case will be discussed herein and the application to circular guide is obvious. If exact E-field-probe axis parallelism is desired in the circular case, the probes may be curved for the off axis case to conform to the curvature of the E-field lines in the $TE_{11}$ case or the conductive stripes may be suitably oriented to obtain the desired relationship.

Figure 3:
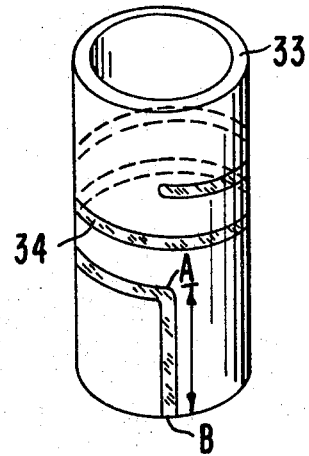
FIG. 3 is an enlarged view of a portion of an equalizer probe shown in the embodiment of FIGS. 1 and 2.

The equalizer probes 30, 31 include dielectric, e.g., quartz tubes 33 having a conductive helical type stripe 34 painted on the outside as shown best in FIG. 3. The total length of the stripe 34 determines the resonant or center frequency of the resultant loss vs. frequency response characteristic of the probe-waveguide equalizer while the conductivity of the conductive stripe determines the Q or bandwidth of the resultant loss vs. frequency response. The higher the resistivity the wider the bandwidth while the lower the resistivity or higher the conductivity the sharper the response curve. For example, a high conductivity metallic stripe such as silver paint provides a very narrow response while a thin platinum alloy film such as a torch fired commercial paint Hanovia Liquid Platinum Alloy No. 130A produced by Hanovia Manufacturing Corporation provides a broader response since it has a lower conductivity than silver paint. Nonmetallic conductors such as, for example, commercial carbon paints may be used to advantage also. The conductivity or resistivity of the stripe is a matter of choice depending on the desired response. An equalizer constructed in X-band rectangular waveguide using a pair of probes which were axially displaced and transversely off-set from the center axis of the guide (the further removed from the plane of the center axis the less the coupling for a given degree of insertion) produced a reduction in gain variation for an X-band helix traveling wave tube over an 8.5 gHz. to 11.5 gHz. operating band from greater than 6 db to less than 2 db using .080 diameter quartz tubes with .020 wall thickness as shown in FIGS. 1–3. The axial displacement was approximately ½ electrical wavelength and the transverse displacement from the center line was approximately ⅕ the width of the broadwall guide dimension. The probe insertion was around ½ of the waveguide height dimension. The conductive stripe was made from a Hanovia 130A platinum alloy paint and had an overall length of 0.6″. The degree of coupling between a resonant conductive stripe and the electromagnetic wave energy is primarily a function of the length of the parallel non-helical portion between A and B, as shown best in FIG. 3 relative to the overall stripe length and the degree to which this portion projects into the waveguide while the resonant frequency of an equalizer probe is primarily a function of the dielectric constant of the dielectric tube and overall length of the stripe and also the spacing between turns of the stripe. The designer of an equalizer according to the teachings of the present invention may adjust the stripe parameters experimentally to obtain a desired response characteristic. A reduction in the individual reactive perturbations introduced by the individual equalizer probes can be achieved by reducing the axial separation to approximately ¼ electrical wavelength if desired when the probes are tuned to the same frequency.

Figure 4:
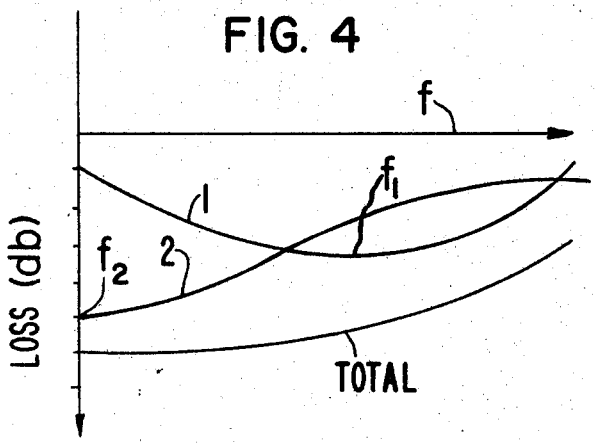
FIG. 4 is an illustrative graphical portrayal of a typical variable loss vs. freqeuncy response characteristic for a two probe axially off-set type of waveguide equalizer such as depicted in FIGS. 1–3.

In FIG. 4, a typical individual probe and combined pair of probes loss vs. frequency response is depicted for purposes of illustrating the wide design latitude achieved by utilizing the teachings of the present invention. Curve 1 represents the individual response for an equalizer probe resonant at one frequency $f_1$ and curve 2 represents the individual response for a second equalizer probe resonant at a lower frequency $f_2$ and the curve labeled TOTAL represents the combined response 1 and 2. Obviously, by merely adjusting any of the aforementioned probe parameters discussed above, it is possible to obtain practically any desired overall or TOTAL response characteristic. The TOTAL response depicted in FIG. 4 is the resultant of a stagger tuning approach. If it is desired to introduce greater loss at the resonant frequency of one probe than the other, then any of several probe parameter changes may be made with ease. For example, the individual probes 30, 31 may be adjustably mounted by means of a threaded screw 36 to which the tube 33 is rigidly secured with screw 36 supported in an internally threaded flanged sleeve 37 affixed to the waveguide in any suitable manner. Rotation of screw 36 produces retraction or insertion of the equalizer probe means within the guide. Since the degree of coupling between the electromagnetic wave energy and the probe is proportional to the degree of penetration of the parallel, non-helical portion of the conductive stripe into the guide the coupling can be easily controlled.

Figure 5:
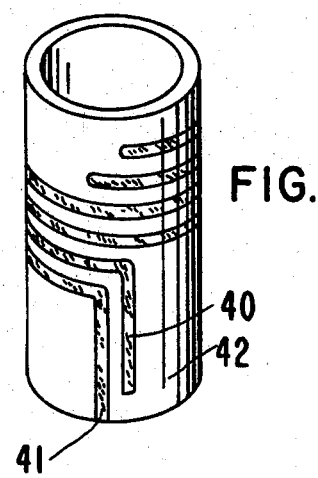
FIG. 5 is a perspective view of a multifilar probe using a bifilar pair of helical conductive stripes on a dielectric tube.

Turning now to FIG. 5 there is depicted another embodiment of an R.F. absorption type probe equalizer incorporating the teachings of the present invention. In this embodiment a pair of conductive stripes 40, 41 are arranged as a bifilar helix form of multifilar helix on the dielectric tube 42. The advantages of this arrangement are to be found in the ability of obtaining greater loss vs. frequency control with a single probe. For example, the pair of stripes may be made of different lengths to obtain a broad band stagger tuned response such as shown in FIG. 4 and/or the resistivity of the individual conductive coatings may be different to provide a sharper and/or broader individual response at the resonant frequencies of the respective stripes to again obtain greater control over the resultant or total response curve of the pair. Quite obviously the pair of stripes may be made identically lossy and resonant at the same frequency to obtain a greater overall loss vs. frequency response with a minimal amount of probe penetration to minimize the reactive perturbation effects and further lower the V.S.W.R. over the operating or design band due to the presence of the equalizer probe or probes in the coupling waveguide of the traveling wave tube.

It is to be understood that a solid dielectric rod may be used in lieu of a dielectric tube in the equalizer probe designs discussed herein. However, the greater reactive perturbation of a solid rod in comparison to a tube is a disadvantage. Also the stripes may be disposed on the inside of a dielectric tube if desired.

Since many changes could be made in the above construction and apparently widely different embodiments of this invention could be made without departing from the scope thereof, it is intended that all matter contained in the above description or shown in the accompanying drawings shall be interpreted as illustrative and not in a limiting sense.

What is claimed is:

1. In a high frequency electron discharge device of the traveling wave tube type including electron beam forming and projecting means disposed at the upstream end portion thereof and slow wave interaction circuit means disposed along the tube axis, the improvement comprising, a R.F. coupling waveguide means coupled to the slow wave circuit at the one end portion thereof to provide a coupling mechanism for electromagnetic wave energy within the operating band of the tube, said waveguide means including at least one probe equalizer means in the shape of a post protruding into said waveguide, said probe equalizer means having a variable attenuation vs. frequency response within the operating band of said traveling wave tube, said probe equalizer means including a dielectric substrate with helically shaped conductive stripe means integrated therewith.

2. The device defined in claim 1 wherein said waveguide means includes a pair of said axially displaced probe equalizers disposed therein with each of said probe equalizers provided with helical conductive stripe means disposed on said dielectric substrate.

3. The device defined in claim 1 wherein said probe equalizer means is adjustably mounted such that the degree of penetration of said probe equalizer means into said waveguide may be varied.

4. The device defined in claim 1 wherein said probe equalizer means is a hollow dielectric post oriented such that its central axis lies parallel to the E-fields of the dominant wave in said waveguide and wherein said conductive stripe means has said generally helical configuration with a straight portion thereof oriented parallel to the central axis of the dielectric post.

5. The device defined in claim 1 wherein said conductive stripe means is a multifilar helix on said dielectric substrate.

6. The device defined in claim 1 wherein said waveguide means includes at least a pair of said probe equalizers disposed therein with each of said probe equalizers provided with conductive stripe means having different overall stripe lengths such that the resonant frequency of each of said equalizer probes is different whereby a broadband loss vs. frequency response is obtained.

7. The device defined in claim 1 wherein said waveguide means includes at least a pair of said probe equalizers disposed therein and axially displaced along the wave propagation axis of the waveguide and individually resonant at the same frequency.

References Cited

UNITED STATES PATENTS

| | | |
|---|---|---|
| 2,425,345 | 8/1947 | Ring. |
| 2,775,741 | 12/1956 | Corbell. |
| 2,805,337 | 9/1957 | Dunsmuir _____ 315—39.53 X |
| 2,869,019 | 1/1959 | Watkins _____ 315—39.3 X |
| 2,981,907 | 4/1961 | Bundy. |
| 3,336,496 | 8/1967 | Blinn _____ 315—3.6 |

HERMAN KARL SAALBACH, Primary Examiner

S. CHATMON, Jr., Assistant Examiner

U.S. Cl. X.R.

315—39.3, 39.53; 333—33, 81, 98